United States Patent
Weber et al.

(10) Patent No.: US 10,848,047 B2
(45) Date of Patent: Nov. 24, 2020

(54) METHOD AND LONG-STATOR LINEAR MOTOR FOR TRANSFERRING A TRANSPORT UNIT AT A TRANSFER POSITION

(71) Applicant: B&R INDUSTRIAL AUTOMATION GMBH, Eggelsberg (AT)

(72) Inventors: Andreas Weber, Salzburg (AT); Friedrich Forthuber, Handenberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 2 days.

(21) Appl. No.: 16/430,790

(22) Filed: Jun. 4, 2019

(65) Prior Publication Data

US 2019/0372447 A1 Dec. 5, 2019

(30) Foreign Application Priority Data

Jun. 5, 2018 (EP) ..................................... 18176080

(51) Int. Cl.
| | |
|---|---|
| *H02K 41/02* | (2006.01) |
| *H02K 41/03* | (2006.01) |
| *H02K 11/30* | (2016.01) |
| *B65G 54/02* | (2006.01) |

(52) U.S. Cl.
CPC .............. *H02K 41/03* (2013.01); *B65G 54/02* (2013.01); *H02K 11/30* (2016.01)

(58) Field of Classification Search
CPC ............... H02K 41/0358; H02K 41/03; H02K 41/0356; B65G 43/10; B65G 35/08
USPC .................. 310/12.05, 12.09, 12.11; 318/135
See application file for complete search history.

(56) References Cited

U.S. PATENT DOCUMENTS

| | | | |
|---|---|---|---|
| 3,845,720 A | 11/1974 | Bohn et al. | |
| 4,819,564 A * | 4/1989 | Brandis | .................. B61B 13/12 |
| | | | 104/250 |
| 4,908,533 A * | 3/1990 | Karita | .................. H02K 41/03 |
| | | | 310/12.18 |

(Continued)

FOREIGN PATENT DOCUMENTS

| | | |
|---|---|---|
| DE | 6945125 | 7/1969 |
| DE | 1 963 505 | 7/1970 |

(Continued)

OTHER PUBLICATIONS

P.C. Khong et al., "Magnetic Guidance of the Mover in a Long-Primary Linear Motor", IEEE Transactions on Industry Applications, vol. 47, No. 3, May/Jun. 2011, pp. 1319-1327.

(Continued)

*Primary Examiner* — Thanh Lam (74) *Attorney, Agent, or Firm* — Greenblum & Bernstein, P.L.C.

(57) ABSTRACT

In order to implement a transfer position in a long-stator linear motor, in which position a transport unit is magnetically steered in order to be deflected from a first transport sections to a second transport section, a stator current is impressed into the drive coils interacting with the transport unit on a first side of the transport unit in the transfer area in order to generate the steering effect on this first side, which stator current either generates only an electromagnetic lateral force or causes only a braking force against the movement direction of the transport unit, or only a combination thereof.

7 Claims, 4 Drawing Sheets

(56) References Cited

U.S. PATENT DOCUMENTS

| | | | | |
|---|---|---|---|---|
| 5,904,101 | A | * | 5/1999 | Kuznetsov .............. B60L 13/10 104/130.02 |
| 6,101,952 | A | | 8/2000 | Thornton et al. |
| 6,770,987 | B1 | * | 8/2004 | Sogard ................... B82Y 10/00 310/12.24 |
| 6,876,107 | B2 | | 4/2005 | Jacobs |
| 7,994,742 | B2 | * | 8/2011 | O'Day ................. G01D 5/2455 318/135 |
| 9,617,089 | B2 | | 4/2017 | Josefowitz et al. |
| 2013/0074724 | A1 | | 3/2013 | King et al. |
| 2016/0380562 | A1 | * | 12/2016 | Weber ................... H02P 25/062 310/12.11 |
| 2017/0346379 | A1 | * | 11/2017 | Weber ................... B60L 15/005 |
| 2018/0323732 | A1 | | 11/2018 | Weber et al. |
| 2019/0002214 | A1 | * | 1/2019 | Weber ................... B65G 43/00 |

FOREIGN PATENT DOCUMENTS

| | | |
|---|---|---|
| EP | 3 109 998 | 12/2016 |
| EP | 3 251 986 | 12/2017 |
| GB | 1247257 | 9/1971 |
| GB | 1297375 | 11/1972 |
| WO | 2004/103792 | 12/2004 |
| WO | 2013/143783 | 10/2013 |
| WO | 2015/036302 | 3/2015 |
| WO | 2015/042409 | 3/2015 |

OTHER PUBLICATIONS

Europe Search Report conducted in counterpart Europe Appln. No. 18176080 (dated Dec. 7, 2018).

* cited by examiner

METHOD AND LONG-STATOR LINEAR MOTOR FOR TRANSFERRING A TRANSPORT UNIT AT A TRANSFER POSITION

CROSS-REFERENCE TO RELATED APPLICATIONS

The present application claims priority under 35 U.S.C. § 119(a) of European Patent Application No. 18176080.2 filed Jun. 5, 2018, the disclosure of which is expressly incorporated by reference herein in its entirety.

BACKGROUND OF THE INVENTION

1. Field of the Invention

The present invention relates to a method of transferring a transport unit of a long-stator linear motor at a transfer position from a first transport section, having a number of drive coils arranged one behind the other in the movement direction of the transport unit in the area of the transfer position, to a second transport section, having a number of drive coils arranged one behind the other in the movement direction of the transport unit in the area of the transfer position, wherein excitation magnets being arranged on each side of the transport unit, which excitation magnets, in order to move the transport unit in the movement direction, interact with drive coils in the area of the transport unit by generating an electromagnetic field by impressing a stator current into drive coils, which field interacts with excitation magnets on the transport unit and, in a transfer area of the transfer position on at least one side of the transport unit, a stator current is impressed into at least one drive coil, which stator current generates a steering effect on the transport unit due to a current component which forms a propulsive force and/or a current component which forms a lateral force of the stator current.

2. Discussion of Background Information

In almost all modern production plants, it is necessary to move parts or components between individual production stations using transport devices, even over longer transport routes. For this purpose, a variety of transport or conveyor systems are known. Continuous conveyors in various designs are often used for this purpose. Conventional continuous conveyors are conveyor belts in various embodiments in which a rotary motion of an electric drive is converted into a linear motion of the conveyor belt. With such conventional continuous conveyors, flexibility is considerably limited, in particular individual transport of individual transport units is not possible. In order to remedy this situation and to meet the requirements of modern, flexible transport devices, so-called long-stator linear motors (LLM) are increasingly being used as replacements for conventional continuous conveyors.

In a long-stator linear motor, a plurality of electrical drive coils forming the stator are arranged along a transport route. A transport unit has a number of excitation magnets arranged on it, either as permanent magnets or as electric coils or short-circuit windings, which interact with the drive coils. The long-stator linear motor can be designed as a synchronous machine, both self-excited or externally excited, or as an asynchronous machine. By actuating the individual drive coils in the area of a transport unit for regulating the magnetic flux generated, a propulsive force is generated in conjunction with the excitation magnets of the transport unit and the transport unit can be moved along the transport route. It is also possible to arrange a plurality of transport units along the transport route, whose movements can be controlled individually and independently of each other. A long-stator linear motor is distinguished in particular by a better and more flexible utilization over the entire working area of the movement (speed, acceleration), an individual regulation/control of the movement of the transport units along the transport route, an improved energy utilization, the reduction of maintenance costs due to the lower number of wearing parts, a simple exchange of the transport units, efficient monitoring and fault detection and an optimization of the product flow. Examples of such long-stator linear motors can be found in WO 2013/143783 A1, U.S. Pat. No. 6,876,107 B2, US 2013/0074724 A1 or WO 2004/103792 A1.

In US 2013/0074724 A1 and WO 2004/103792 A1 the drive coils of the stator are arranged on the upper side of the transport route. The permanent magnets are arranged on the underside of the transport units. In WO 2013/143783 A1 and U.S. Pat. No. 6,876,107 B2 the permanent magnets are provided on both sides of the centrally arranged drive coils, whereby the permanent magnets surround the stator of the long-stator linear motor and the drive coils interact with the permanent magnets arranged on both sides.

The transport units are guided along the transport route either by guide rollers, as for example in WO 2013/143783 A1 or U.S. Pat. No. 6,876,107 B2, or by magnetic guidance, as for example in WO 2004/103792 A1. In the case of magnetic guidance, guide magnets are provided on both sides of the transport units, which magnets interact with guide rods arranged oppositely on the transport route. The guide rods form a magnetic yoke which close the magnetic circuit of the guide magnets. The magnetic guide circuits formed in this way therefore counteract a lateral movement of the transport units, whereby the transport units are guided laterally. A similar magnetic lateral guide can also be found in U.S. Pat. No. 6,101,952 A.

Khong, P. C., et al., "Magnetic Guidance of the Mover in a Long-Primary Linear Motor", IEEE Transactions on Industry Applications, vol. 47, no. 3, May/June 2011, p. 1319-1327 also describes a magnetic guidance of a transport unit of a long-stator linear motor. The stator currents generate lateral forces which counteract a deviation of the transport unit from a reference position in the lateral direction in order to keep the transport unit in the reference position for guidance.

In many transport devices, transfer positions are also necessary, e.g. in the form of turnouts or transfer points from two-sided route portions to one-sided route portions, in order to enable complex and intelligent route planning or route realization of the transport device. Up to now, these transfer positions have often been realized with the aid of additional mechanical trigger units. An example of this can be found in US 2013/0074724 A1 in the form of a mechanically triggered turnout by means of movable deflection arms or a turntable.

However, transport devices have already become known in which additional electrical auxiliary coils are used in order to trigger the turnout. For example, in U.S. Pat. No. 6,101,952 A the auxiliary coils are arranged on the magnetic yoke of the magnetic guide circuit, while in US 2013/0074724 A1 the auxiliary coils are arranged laterally on the transport route. In both cases, a magnetic flux is impressed into the magnetic guide circuit by the auxiliary coils, which flux generates a lateral force that directs the transport unit in one direction. However, the additional auxiliary coils required increase the effort needed to implement a transport device, as the auxiliary coils have to be additionally installed and electrically supplied and actuated. In addition, separate guide magnets are also required on the transport units for this purpose.

DE 1 963 505 A1, WO 2015/036302 A1 and WO 2015/042409 A1 describe magnetically activated turnouts of a long-stator linear motor which do not require additional auxiliary coils. In these long-stator linear motors, the excitation magnets of the transport units are arranged between drive coils arranged on both sides. In the area of a turnout, a lateral force can be generated by applying current to the drive coils on only one side of the transport route, with which lateral force the transport unit can be steered in the area of the turnout in order to move the transport unit further along the desired transport route after the turnout. The turnout is triggered in such a way that the drive coils in the area of the turnout are only activated on the side of the transport route along which the transport unit is to move further. The drive coils of the other side are deactivated (DE 1 963 505 A1, WO 2015/036302 A1) or have reversed polarity (WO 2015/036302 A1). But that brings with it certain problems. If the drive coils of one side in the area of the turnout are only deactivated for control, the transport unit in the area of the turnout loses half of the propulsive force, so that the area of the turnout can only be passed through at a reduced speed. This could lead to congestion of the transport units in the turnout area, which would be unfavorable for controlling the transport device. The polarity reversal is purely static and a certain, specified lateral force can be activated or deactivated. By reversing the polarity, a certain specified lateral force can be set in the area of the turnout. If the lateral force is overdimensioned for safety reasons during turnout travel, this leads to increased friction and increased wear. The transport units would thereby have to be mechanically dimensioned accordingly, making the transport units larger, heavier and more expensive. In addition, this also increases wear on the mechanical components of the transport units, in particular the mechanical guide members. If, on the other hand, the lateral force is chosen to be smaller, the safety of the turnout travel is reduced, for example if the transport unit with load is heavier than assumed. Therefore, reversing the polarity to trigger the turnout for the operation of a long-stator linear motor is also rather disadvantageous.

From EP 3 109 998 A1, a turnout triggering that is electromagnetically activated with the drive coils of the long-stator linear motor is known. A stator current is impressed in the transfer area of a transfer position in a drive coil of one side, which stator current generates a force component forming a propulsion force acting on the transport unit and/or a force component forming a lateral force in order to generate a steering effect, wherein this steering effect is superimposed on the propulsion force serving the propulsion movement and acting on the transport unit. Since, of course, the propulsive force is also generated by the stator current, the stator current must generate both the propulsive force and the steering effect. The power unit of the long-stator linear motor which supplies the drive coils with current is, however, limited in terms of power and can therefore only provide a certain maximum current. Therefore, the available current, at least in the transfer area, cannot be fully used to generate the propulsive force. Since usually no steps in the propulsion force are desired (which can lead to steps in acceleration or jerk), this also limits the current available for the propulsion force outside the transfer area.

To solve this problem one could, of course, strengthen the power unit in terms of power in order to enable larger currents. However, since a long-stator linear motor contains a large number of drive coils (a number in the order of hundreds or thousands is not uncommon), such a hardware change would significantly increase the total costs of the long-stator linear motor.

SUMMARY OF THE EMBODIMENTS

Embodiments are directed to a transport device in the form of a long-stator linear motor in which the available electrical power of the power unit of the long-stator linear motor can be better utilized to generate a stator current of a drive coil in a transfer position for steering a transport unit.

Aspects of the embodiments are achieved by impressing a stator current into the drive coils interacting with the transport unit on a first side of the transport unit in the transfer area in order to generate the steering effect on this first side, which stator current either generates only an electromagnetic lateral force or causes only a braking force against the movement direction of the transport unit, or only a combination thereof. This way, in order to generate the steering effect on the transport unit on this first side, no electrical energy for generating an electromagnetic propulsive force has to be provided. The entire available power of the power unit of the long-stator linear motor for energizing the drive coils on this first side can thereby flow into the generation of the steering effect. This way, the steering effect itself can also be increased, because all electrical energy can flow into the generation of the steering effect and a safer steering of the transport unit can be achieved.

It does not matter whether an electromagnetic lateral force is generated at the opposite second side, or an electromagnetic propulsive force in the movement direction (or both), or whether no force at all is generated at this second side by not energizing the drive coils of this second side.

BRIEF DESCRIPTION OF THE DRAWINGS

The present invention is explained in more detail below referring to FIGS. 1 to 5, which show exemplary, schematic and non-limiting advantageous embodiments of the invention. In the drawings.

DETAILED DESCRIPTION OF THE EMBODIMENTS

Figure 1:
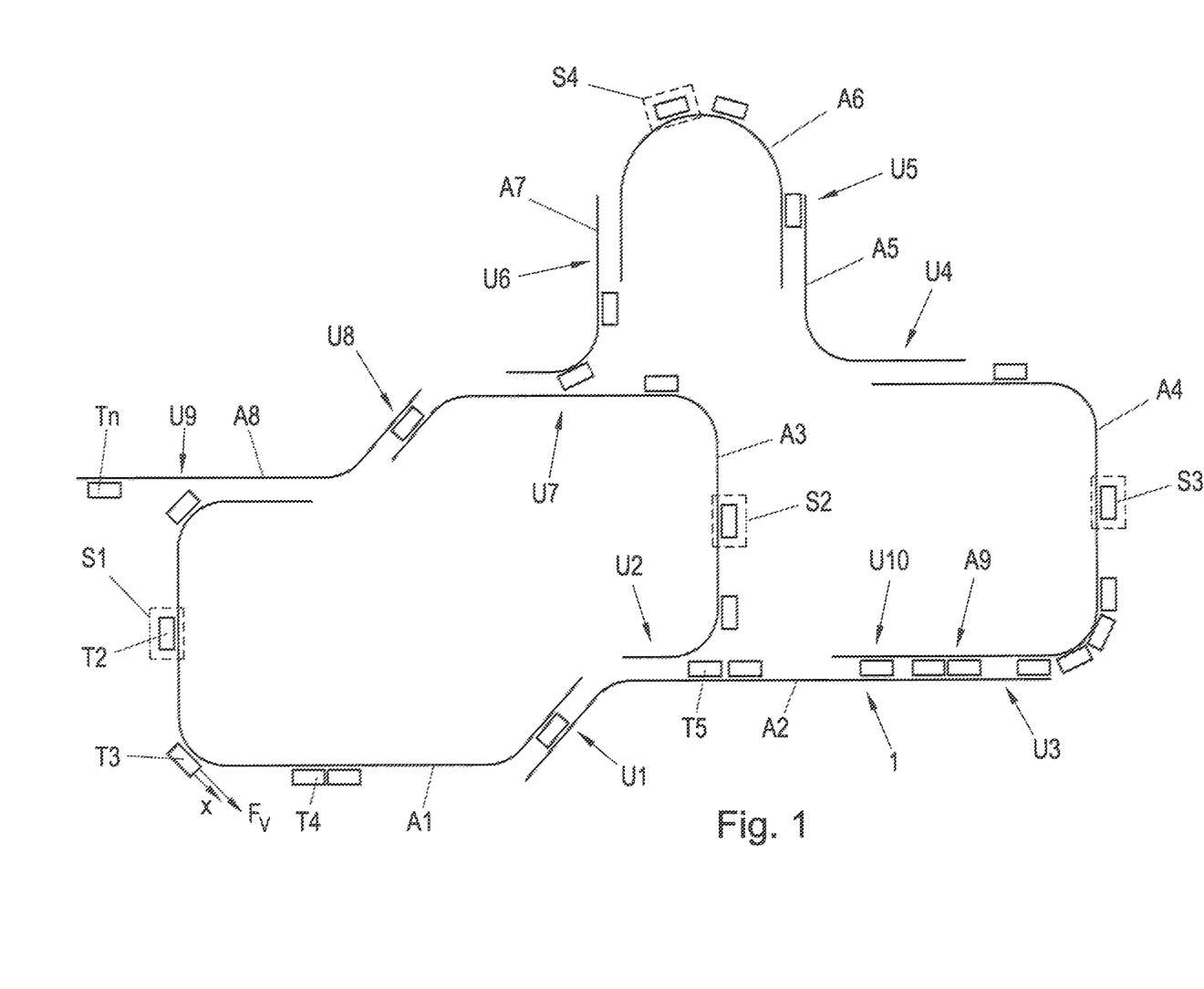
FIG. 1 shows a transport device in the form of a long-stator linear motor.

FIG. 1 shows an example of a transport device 1 in the form of a long-stator linear motor. The transport device 1 consists of a number of transport sections A1 ... A9, which are combined to form a transport device 1. This modular structure enables a very flexible design of the transport device 1, but also requires a plurality of transfer positions U1 ... U9, at which the transport units T1 ... Tn moved on the transport device 1 are transferred from one transport sections A1 . . . A9 to another (for reasons of clarity, not all transport units are marked with a reference sign in FIG. 1). n is an index that stands for the existing number of transport units.

The transport device 1 is designed as a long-stator linear motor in which the transport sections A1 . . . A9 each form a part of a long-stator of a long-stator linear motor in a manner known per se. It is also known that a transport sections A1 . . . A9 can be composed of individual transport segments TS, each transport segment TS carrying a number of drive coils. Along the transport sections A1 . . . A9, therefore, a plurality of electric drive coils are arranged in the longitudinal direction x in a known manner (not shown in FIG. 1 for reasons of clarity), which interact with excitation magnets on the transport units T1 . . . Tn (see FIG. 3). In an equally well-known manner, by controlling the electric stator current $i_A$ of the drive coils 7, 8, a propulsive force $F_v$ is generated for each of the transport units T1 . . . Tn which moves the transport units T1 . . . Tn in the longitudinal direction x along the transport sections A1 . . . A9, i.e. along the transport route. Each of the transport units T1 . . . Tn can be moved individually (speed, acceleration, path) and independently (except to avoid possible collisions) by the other transport units T1 . . . Tn. As this basic principle of a long-stator linear motor is sufficiently well known, it will not be explained in more detail.

Some transfer positions U1 . . . U10 are also arranged along the transport route of the transport device 1. Different types of transfer positions U1 . . . U10 are conceivable. At the transfer positions U2 and U7 e.g. a turnout is provided, while the other transfer positions U1, U3 . . . U6, U8, U9 are designed e.g. as transfer points from one transport section A1 . . . A8 to another. At the transfer position U10, for example, a transition from a one-sided transport section A2 to a two-sided transport sections A9 is provided. At the transfer position U2 (turnout) a transport unit T6 can, for example, be moved on to the transport section A2 or the transport sections A3. At a transfer position U1 (transfer position), a transport unit T5 is transferred from the one-sided transport section A1 to the one-sided transport section A2. A transport unit Tn can naturally travel through each transfer position U in both directions.

A number of work stations S1 . . . S4, in which manipulation of the components transported with the transport unit T1 . . . Tn takes place, can also be arranged along the transport route of the transport device 1, which is substantially given by the longitudinal direction x of the transport section A1 . . . A8. The work station S1 can, for example, be designed as an infeed and/or outfeed station in which finished components are removed and components to be processed are transferred to a transport unit T1 . . . Tn. In the work stations S2 . . . S4 any machining steps can be carried out on the components. The transport units T1 . . . Tn can be stopped for processing in a work station S1 . . . S4, e.g. in a filling station in which empty bottles are filled, or can be moved through, e.g. in a temperature control station in which components are temperature-treated, if necessary also at a different speed than between the work stations S1 . . . S4.

The transport device 1 comprises at least two transport sections Am, An and at least one transfer position U connecting these two transport sections Am, An. In order to be able to realize a transfer position U according to the invention, it is necessary, at least in the area of the transfer position U, that drive coils 7, 8 are provided on both sides of the transport unit Tn, as seen in the movement direction x, and that excitation magnets 4, 5 are arranged on both sides of the transport unit Tn. The excitation magnets 4, 5 can be designed as permanent magnets or as electromagnets.

Figure 2:
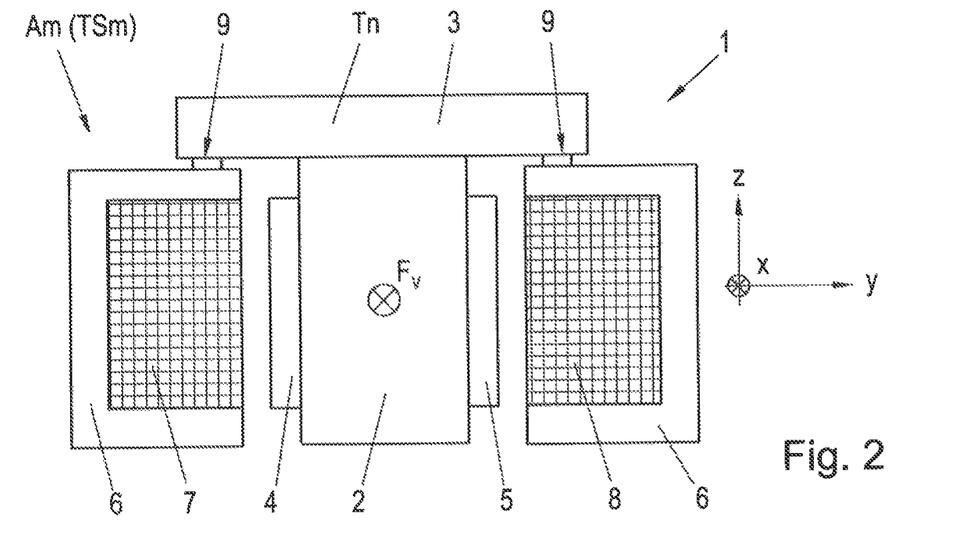
FIG. 2 shows the design and electrical structure of the long-stator linear motor.

A particularly advantageous embodiment of the long-stator linear motor, at least in the area of the transfer positions U, is explained with reference to FIG. 2. FIG. 2 shows a cross-section through any transport section Am and a transport unit Tn moved on it. A transport unit Tn, for example, consists of a base body 2 and a component receptacle 3 arranged on it, whereby the component receptacle 3 can in principle be arranged at any point of the base body 2, in particular also on the underside for hanging components, or can also be designed as part of the base body 2. The number of excitation magnets 4, 5 of the long-stator linear motor is arranged on the base body 2 on both sides of the transport unit Tn (seen in the movement direction). The transport route of the transport device 1, or a transport section Am, or a transport segment TSm of a transport section Am, is formed by a stationary guide construction 6, on which the drive coils 7, 8 of the long-stator linear motor are arranged. The base body 2 with the excitation magnets 4, 5 arranged on both sides is arranged between the drive coils 7, 8. This means that in each case at least one excitation magnet 4, 5 is arranged opposite at least one drive coil 7, 8 (or a group of drive coils) and thereby interacts with the drive coil 7, 8 to generate a propulsive force $F_v$. The transport unit Tn can thereby be moved between the guide construction 6 and along the transport route. Naturally, guide members 9, such as rollers, wheels, sliding surfaces, etc. (not shown, or only indicated, here for reasons of clarity) can also be provided on the base body 2 and/or on the component receptacle 3 in order to guide the transport unit Tn along the transport route. The guide members of the transport unit Tn interact with the stationary guide construction 6, or parts thereof, for guiding purposes, e.g. by the guide members 9 supporting themselves on the guide construction 6, sliding off or rolling off on it, etc. However, the transport unit Tn can also be guided by the provision of guide magnets.

In order to move a transport unit Tn forward in the movement direction x, a stator current $i_{A1}$, $i_{A2}$ is impressed into the drive coils 7, 8 on both sides in the area of the transport unit Tn in order to generate an electromagnetic field which interacts with the excitation magnets 4, 5 at the transport unit Tn. Different stator currents $i_{A1}$, $i_{A2}$ can also be impressed into different drive coils 7, 8. Here it is also sufficient to impress a stator current $i_{A1}$, $i_{A2}$ into the drive coils 7, 8 only, which can just interact with the excitation magnets 4, 5 of the transport unit Tn. For the movement of the transport unit Tn, however, the drive coils 7, 8 arranged on both sides do not have to be energized simultaneously by impressing a stator current $i_A$. It is generally sufficient if the propulsive force $F_v$ acting on the transport unit Tn for movement is generated only by means of the drive coils 7, 8 on one side and the excitation magnet 4, 5 on the corresponding side of the transport unit Tn. On route sections of the transport route where a large propulsive force $F_v$ is required, e.g. in the case of a gradient, a heavy load or in areas of acceleration of the transport unit Tn, the drive coils 7, 8 can, for example, be energized on both sides (if available, e.g. transport section A9 in FIG. 1), whereby the propulsive force $F_v$ can be increased. It is also conceivable that in certain transport sections A the guide construction 6 is only designed on one side, or that in certain transport sections A the guide construction 6 is designed on two sides, but is only equipped with drive coils 7, 8 on one side. This is also indicated in FIG. 1, where route sections with guide construction 6 on both sides and route sections with guide construction 6 on only one side are indicated.

Analogous to a rotating electric motor, the individual stator currents of the active drive coils 7, 8 can be transformed into a dq-coordinate system in a known manner. In this dq-coordinate system, a current space vector results with a propulsive force-forming current component (q-component) and a lateral force-forming current component (d-component). For the movement of a transport unit Tn, the current space vector of the stator current $i_A$ required for this in the dq-coordinate system, with propulsive force-forming current component (q-component) and/or lateral force-forming current components (d-component), is calculated (for example in a current controller) and then converted into the individual stator currents $i_{A1}$, $i_{A2}$, which are to be applied to the acting drive coils 7, 8. This transformation can be performed with the known Park Transformation adapted to the linear motor. To move the transport unit Tn, the electromagnetic field generated by the individual stator currents $i_{A1}$, $i_{A2}$ must continue to travel along the transport route, which is why other drive coils 7, 8 must always be supplied with current for the movement of the transport unit Tn in the movement direction x.

Figure 3:
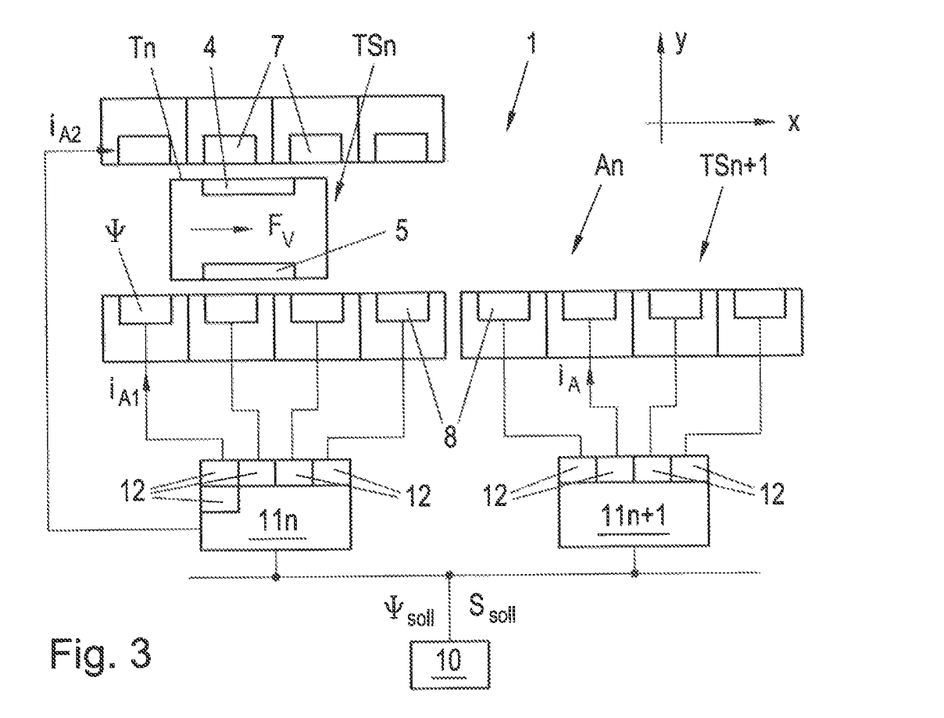
FIG. 3 shows a control concept of the long-stator linear motor.

For the movement of a transport unit Tn, the stator currents $i_{A1}$, $i_{A2}$ of the currently acting drive coils 7, 8 are therefore controlled. For this purpose, each drive coil 7, 8 is assigned a coil controller which controls the stator current $i_{A1}$, $i_{A2}$ of the assigned drive coils 7, 8. The drive coils 7, 8 can thereby be independently energized with a stator current $i_{A1}$, $i_{A2}$, for example by applying corresponding electrical voltages to the drive coil 7, 8. In this context one also speaks of single coil actuation. A possible control concept for the individual control of the drive coils 7, 8 is shown in FIG. 3. In this example, a transport section An is composed of a plurality of transport segments TSn, TSn+1 with a number of drive coils 7, 8 each. The transport segment TSn is a two-sided segment with drive coils 7, 8 on both sides and the transport segment TSn+1 is a one-sided segment with drive coils 8 on only one side. Each drive coil 7, 8 is assigned a coil controller 12, which calculates the stator current $i_A$, $i_{A2}$ to be impressed into the assigned drive coil 7, 8. A power unit which generates the required stator current $i_{A1}$, $i_{A2}$ and impresses the current into the drive coils 7, 8 is not shown for reasons of clarity. The coil controllers 12 of a plurality of drive coils 7, 8 can also be combined in segment control units 11, whereby it is advantageous to combine all coil controllers 12 of the drive coils 7, 8 of a transport segment TSn, TSn+1 in an assigned segment control unit 11. Therefore the segment control unit 11 can be, for example, a computer hardware on which the coil controllers 12 are each implemented as software. However, a coil controller 12 can self-evidently also be designed as separate hardware and software. The individual coil controllers 12 can also be combined in any other way in a segment control unit 11. For example, segment control units 11 with coil controllers 12, or coil controller 12 in general, can be assigned to the drive coils 7, 8 on both sides.

A transport unit Tn, which is located in a route section, for example a transport segment TSn, is therefore controlled by the corresponding coil controllers 12. Substantially, this means that the coil controllers 12 control the drive coils 7, 8 of the associated route section, e.g. the transport segment TSn, in such a way that the transport unit Tn is moved along the transport segment TS in the desired manner (speed, acceleration) by the generated propulsive force $F_V$. The movement of the transport unit Tn through the transport device 1 can be monitored and specified in a higher-level plant control unit 10, which is connected to the coil controllers 12. The plant control unit 10 controls, for example, the movement of the transport units Tn through the transport device 1 by position specifications or speed specifications (as set-point values of the control). The coil controllers 12 then correct any error between set-point value (e.g. set-point position) and actual value (e.g. actual position). Since such a control of the movement of a transport unit Tn of a long-stator linear motor with single coil actuation is well known, e.g. from EP 3 251 986 A1, it will be explained below only to the extent necessary for an understanding of the present invention.

It is important that by controlling the stator currents $i_{A1}$, $i_{A2}$ of the drive coils 7, 8 a propulsive force $F_V$ can be generated by a propulsive force-forming current component $i_{Aq1}$, $i_{Aq2}$ of the stator current $i_A$ (in the dq-coordinate system), or by the resulting magnetic flux ψ (magnetic flux ψ and stator current $i_A$ are to be regarded as equivalent). The propulsive force $F_V$ can be generated by the drive coils 7, 8 on only one side, or by the drive coils 7, 8 on both sides. In addition to the propulsive force $F_V$ required for the movement of the transport unit Tn, an electromagnetic lateral force $F_{EMS}$ acting on the transport unit Tn in the lateral direction y transverse to the movement direction x can also be generated with a drive coil 7, 8 by a lateral force-forming current component $i_{Ad1}$, $i_{Ad2}$ of the stator current $i_A$ (in the dq-coordinate system). For this purpose, for example, one of the drive coils 7, 8 interacting with the transport unit Tn is impressed with a stator current $i_{A1}$, $i_{A2}$ which, in addition to the propulsive force-forming electromagnetic force component which produces the propulsive force $F_v$, causes a force component transverse to it, i.e. in the lateral direction y. According to the invention, this is used in a transfer position U in order to generate a steering effect L acting on the transport unit Tn in order to steer the transport unit Tn specifically to a desired transport section An.

Figure 4:
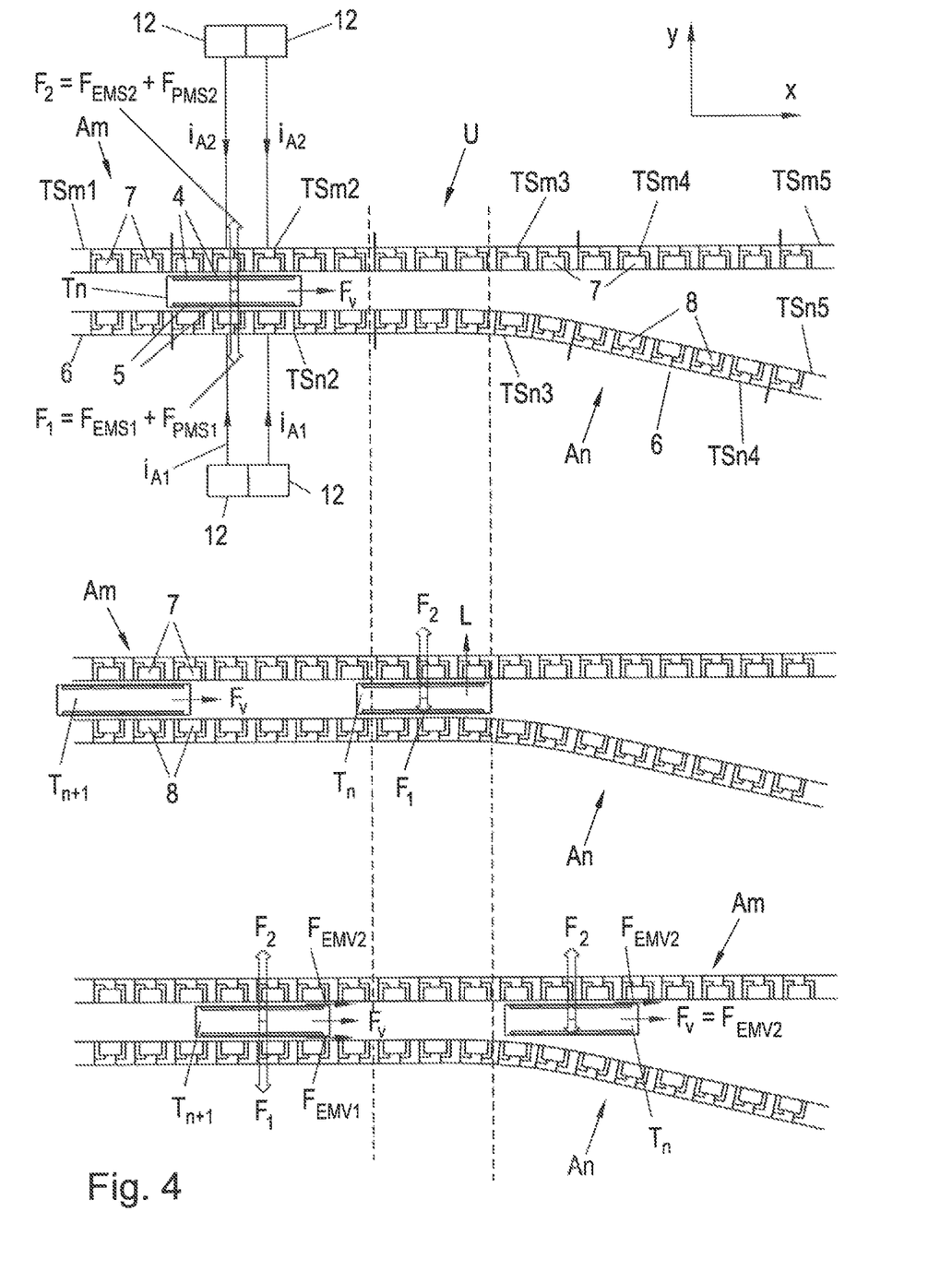
FIG. 4 shows a first embodiment of a method according to the invention for transferring a transport unit at a transfer position.

A first embodiment example of the invention is shown in FIG. 4 with the example of a transfer position U in the form of a diverging turnout, such as the transfer position U2 in FIG. 1, between two transport sections Am, An. Along the transport sections Am, An, as described above, at least in the transfer position U, the drive coils 7, 8 are arranged one behind the other in the movement direction. The transport sections Am, An consist of transport segments TSm1, TSm2, TSm3, TSm4, TSm5 following one behind another in the longitudinal direction on a first side and transport segments TSn1, TSn2, TSn3, TSn4 on the opposite second side, each with a number of drive coils 7, 8. The transport sections Am, An are arranged side by side at the beginning of the transfer position U, at least up to the beginning of the diverging portion, so that the drive coils 7, 8 of the two sides can each interact with excitation magnets 4, 5 on both sides of the transport unit Tn. Each drive coil 7, 8 is assigned a coil controller 12, which calculates the stator current $i_{A1}$, $i_{A2}$ to be applied, whereby the stator currents $i_{A1}$, $i_{A2}$ of different drive coils 7, 8 do not have to be the same and are generally not the same. Especially in the case of a turnout as transfer position U, there is a route section in the diverging area of the exit (or entry with reverse travel direction) on which a guide construction 6 or drive coils 7, 8 can only be arranged on one side.

The excitation-magnetic lateral forces $F_{PMS1}$, $F_{PMS2}$ always act on the transport unit Tn on both sides due to the interaction of the excitation magnets 4, 5 of the transport unit Tn with ferromagnetic constituents of the guide construction 6. The excitation-magnetic lateral forces $F_{PMS1}$, $F_{PMS2}$ acting on both sides of the transport unit Tn are usually (but not necessarily), with the same air gap, the same structure of the guide construction 6 on both sides, etc., of the same magnitude and opposite to each other, so that the vectorial sum of the acting excitation-magnetic lateral forces $F_{PMS1}$, $F_{PMS2}$ preferably results in zero.

The present invention is now based on the fact that the magnetic flux ψ or the magnetic field between transport unit Tn and drive coils 7, 8 or the guide construction 6, which field is caused by the excitation magnets 4, 5, is specifically influenced on at least one side (in transverse direction y) via the stator current $i_{A1}$, $i_{A2}$ of at least one drive coil 7, 8 in order to impress a steering effect L on the transport unit Tn.

In a first embodiment of the invention, a stator current $i_{A1}$, $i_{A2}$ is impressed in a transfer area of the transfer position U, i.e. in the area in which the transport unit Tn must be specifically steered, on one side of the transport unit Tn into the drive coils 7, 8 of this side interacting with the transport unit Tn, which stator current only generates an electromagnetic lateral force $F_{EMS}$. On this side, therefore, only a lateral force-forming current component $i_{A1d}$, $i_{A2d}$ (in the dq-coordinate system) is generated, and on this side, the stator current $i_{A1}$, $i_{A2}$ does not generate a propulsive force $F_V$. A propulsive force $F_{V2}$, on the other hand, can be generated on the opposite side of the transport unit Tn. However, it is possible that no propulsive force $F_{V2}$ is generated on the second side either. In this case, the transport unit Tn would move in the movement direction x through the transfer position U without an active drive. Since a transfer position U of a transport unit Tn is typically passed through in a few milliseconds, the momentary switching off of a propulsive force $F_V$ on only one side, or on both sides, is hardly noticeable in the movement of the transport unit Tn and can be accepted. In both cases, however, the entire available electric current on one side can be used to generate the steering effect L, because no current is required on this side to generate the propulsive force $F_V$. An electromagnetic lateral force $F_{EMS}$ can also be generated on the second side via the stator current $i_{A1}$, $i_{A2}$, but this does not necessarily have to be the case.

The flux components $\psi_d$ of the electromagnetic field impressed via the stator currents $i_{A1}$, $i_{A2}$, which components cause a lateral force, serve to weaken or strengthen the acting excitation-magnetic field. Therefore, the resulting lateral forces F1, F2 act on the transport unit Tn on both sides, which lateral forces are the sum of the acting excitation-magnetic lateral forces $F_{PMS}$ and, if present, of the electromagnetic lateral force $F_{EMS}$ on each side of the transport unit Tn, i.e. $F_1=F_{PMS1}+F_{EMS1}$ and $F_2=F_{PMS2}+F_{EMS2}$. The steering effect L then results from the vectorial sum of the resulting lateral forces $F_1$, $F_2$. Via the stator currents $i_{A1}$, $i_{A2}$, or via the lateral force-forming current components $i_{A1d}$, $i_{A2d}$, the generated lateral force $F_{EMS1}$, $F_{EMS2}$ can be set specifically in direction and magnitude, with which the steering effect L can be set specifically.

Wherever no electromagnetic lateral force $F_{EMS}$ is required, e.g. outside a transfer position U, the stator currents $i_{A1}$, $i_{A2}$ impressed in the drive coils 7, 8 are preferably controlled in such a way that the vectorial sum of the resulting lateral forces $F_1$, $F_2$ is zero. Ideally, this means that the electromagnetic lateral forces $F_{EMS1}$, $F_{EMS2}$ are equal to zero. This achieves a maximum efficiency of the movement of the transport unit Tn in these areas, since all available electrical energy can flow into the generation of the propulsive force $F_V$.

It should only be mentioned here in passing that there are also easily magnetizable and demagnetizable permanent magnets, such as AlNiCo magnets, which can be specifically magnetized by the electromagnetic field generated by the drive coils 7, 8, for example. This way, for example, the polarity of such permanent magnets can be changed as excitation magnets 4, 5 on a transport unit Tn or the magnetic voltage of the permanent magnets can be increased or decreased. This way, the excitation-magnetic lateral force $F_{PMS1}$, $F_{PMS2}$ could also be specifically influenced to generate a steering effect.

The passage of a transport unit Tn through a transfer position U can therefore proceed as follows, as explained in FIG. 4. In the entrance area of the transfer position U (FIG. 4 above), the stator currents $i_{A1}$, $i_{A2}$ are preferably impressed on both sides so that the vectorial sum of the resulting lateral forces $F_1$, $F_2$ is zero. For this purpose it can be provided that no electromagnetic lateral forces $F_{EMS1}$, $F_{EMS2}$ are generated. The resulting lateral forces $F_1$, $F_2$, which are preferably reduced to the excitation-magnetic lateral forces $F_{PMS1}$, $F_{PMS2}$, are therefore normally of the same magnitude and opposite to each other in the entrance area of the transfer position U and therefore cancel each other out. However, the stator currents $i_{A1}$, $i_{A2}$ generate a propulsive force $F_V$ which is generated by the drive coils 7, 8 on both sides or by only one side.

In the transfer area (FIG. 4 center) of the transfer position U, the stator currents $i_{A1}$, $i_{A2}$, which are impressed into the drive coils 7, 8, are now changed in such a way that field weakening or field strengthening of the excitation-magnetic field results in lateral forces $F_1$, $F_2$ on the two sides of the transport unit Tn, which forces are different in magnitude. In the embodiment example shown, the drive coils 8 on a first side are supplied with a stator current $i_{A1}$, which coils generate only a lateral force $F_{EMS1}$, but no electromagnetic propulsive force $F_{EMV1}$. For this purpose, for example, the drive coils 8 on this side are energized with stator currents $i_{A1}$, which weaken the excitation-magnetic field. In other words, the stator currents $i_{A1}$ of the first side generate an electromagnetic lateral force $F_{EMS1}$ which is directed against the excitation-magnetic lateral force $F_{PMS1}$ acting on this side. On the opposite second side, no stator currents $i_{A2}$ at all are impressed into the acting drive coils 7, whereby the transport unit Tn in this case is moved through the transfer area of the transfer position U without propulsive force $F_V$. On the first side this leads to a resulting first lateral force $F_1=F_{PMS1}-F_{EMS1}$ and on the second side to a resulting second lateral force $F_2=F_{PMS2}>F_1$. The steering effect L, here a steering force in the desired direction, results from the difference between $F_1$ and $F_2$. The resulting steering effect L guides the transport unit Tn in the shown embodiment example along the transport section Am, whereby the transport unit Tn is moved straight ahead in the exit area of the transfer position U (FIG. 4 below). If the transport unit Tn is to be moved further on the transport section An, a steering effect L must be generated which directs the transport unit Tn to this transport section An (i.e. $F_1>F_2$).

However, it is also possible that a second electromagnetic lateral force $F_{EMS2}$ is generated on the second side by the stator currents $i_{A2}$ of the drive coils 7 acting on this side. Preferably, electromagnetic lateral forces $F_{EMS1}$, $F_{EMS2}$ are generated on both sides of the transport unit Tn, which forces point in the same direction, so that the excitation-magnetic lateral force $F_{PMS}$ is amplified on one side and weakened on the other. One could also change the magnetic flux ψ in such a way that the generated electromagnetic lateral forces $F_{EMS1}$, $F_{EMS2}$ on the two sides of the transport unit Tn have different directions, but these would only partially cancel each other out, which would ultimately only result in higher losses. The field weakening occurs preferably on the side of the transport unit Tn along which the transport unit Tn is not to be moved further, here at the drive coils 8. The field strengthening is preferably at the side where the transport unit Tn is to be moved further, here at the drive coils 7. Ultimately, it is only important that a difference in the resulting lateral forces $F_1$, $F_2$ on both sides results as a steering effect in the desired direction. It is also possible to generate an electromagnetic propulsive force $F_{EMV2}$ on the second side by the stator currents $i_{A2}$ of the drive coils 7 acting on this side, which can also be done in addition to an electromagnetic lateral force $F_{EMS2}$. This results, in the transfer area, in a resulting propulsive force $F_V$ on the transport unit Tn that is either zero or corresponds to the acting electromagnetic propulsive force $F_{EMV2}$ ($F_V=F_{EMV2}$).

As only an electromagnetic lateral force $F_{EMS1}$ is generated on the first side, sufficient electrical energy is available to sufficiently strengthen or weaken the acting excitation-magnetic lateral force $F_{PMS1}$ if necessary, in order to generate the steering effect L in the desired direction, here in the direction of the first side. If an electromagnetic propulsive force $F_{EMV1}$ were additionally generated on this side, this might not be possible under certain circumstances.

In the exit area (FIG. 4 below) an electromagnetic propulsive force $F_{EMV2}$ Can again be generated with the drive coils 7 of the transport section Am, along which the transport unit Tn is further moved. As soon as the transport unit Tn has been safely steered to the desired route section, the generation of an electromagnetic lateral force $F_{EMS1}$, and possibly of an electromagnetic lateral force $F_{EMS2}$ on the other side, can be stopped again, because then normally only a propulsive force $F_V$ is required.

It is thereby obvious that by controlling the stator currents $i_A$ in the area of the transfer position, a steering effect L in one of the two lateral directions can be generated, which guides the transport unit Tn along the desired route section. At any time of the movement of the transport unit Tn, however, not only the direction of the steering effect L can be set, but in particular also the magnitude of this steering effect L. This steering effect L can also be variable over time, when passing through the transfer position U, and can also be adjusted on the respective transport unit Tn and also on the actual movement. For example, a transport unit Tn loaded with a heavier load or moving faster may require a higher steering effect L than an empty or slow moving transport unit Tn.

The active control of the stator currents $i_{A1}$, $i_{A2}$ (or of the lateral force-forming current components $i_{Ad1}$, $i_{Ad2}$ in the dq-coordinate system) is started at the latest when the transport unit Tn enters the transfer area of the transfer position U, preferably before that. The electromagnetic lateral forces $F_{EMS1}$, $F_{EMS2}$ are controlled in the transfer area by the stator currents $i_{A1}$, $i_{A2}$ at any point in time in such a way that the required steering effect L is formed in the desired direction and with the required magnitude. In order to ensure a defined location of the transport unit Tn over the entire length of the transfer position U, it is advantageous to actively control the electromagnetic lateral forces $F_{EMS1}$, $F_{EMS2}$ along the entire length of the transfer position U.

When the transport unit Tn exits the transfer position U (FIG. 4 below), the air gap between the non-traveled route section (here transport sections An) and the transport unit Tn increases at the same time. This greatly reduces the excitation-magnetic lateral force $F_{PMS2}$ on this route section, which supports the guidance of the transport unit Tn along the desired route section (here the transport sections Am). In particular, this reduction of the excitation-magnetic lateral force $F_{PMS2}$ could be sufficient to move the transport unit Tn in the exit area along the desired transport section Am. The drive coils 8 at the exit of the transfer position U would no longer have to be actively controlled in order to generate an electromagnetic lateral force $F_{EMS1}$.

However, the transfer position U does not have to be designed as a turnout, but can also be designed as a transition from one transport section Am to another transport section An, such as e.g. the transfer position U1 in FIG. 1, where, for example, a transition from a two-sided transport section (drive coils on both sides) to a one-sided transport section (drive coils on one side) is made. In practice, only the diverging branch of the transport section An would be omitted. However, this would not change the basic sequence of the transfer, as described above using the example of the turnout in FIG. 4. In this case, however, it may be advantageous to actively control the electromagnetic lateral force $F_{EMS}$ only on the side where the transport unit Tn is moved further.

Figure 5:
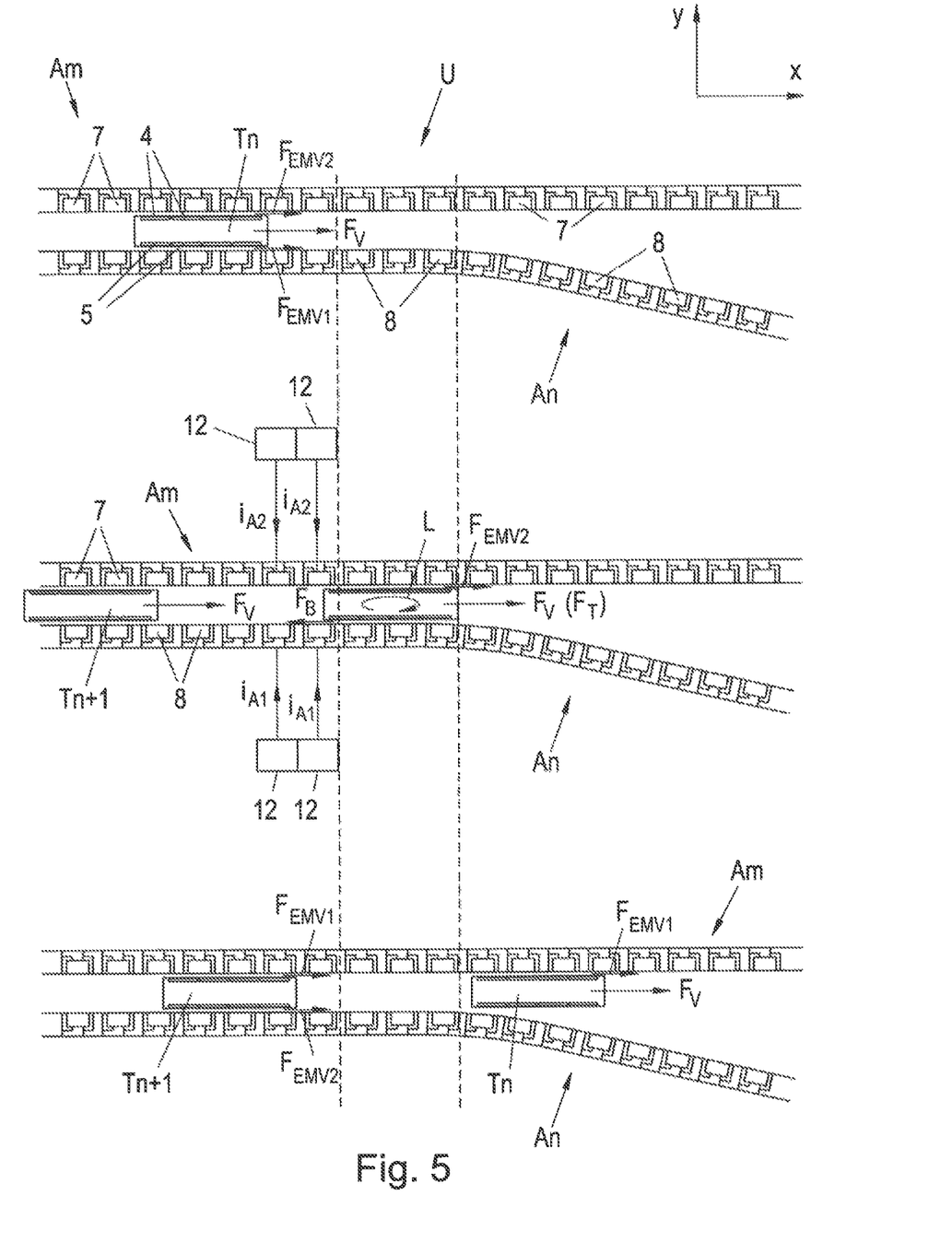
FIG. 5 shows a second embodiment of a method according to the invention for transferring a transport unit at a transfer position.

A further embodiment according to the invention is again explained by the example of a turnout as transfer position U using FIG. 5. In the transfer position U, as already described in detail, two transport sections Am, An come together. The drive coils 7, 8 interacting with the excitation magnets 4, 5 on both sides of the transport route generate electromagnetic propulsive forces $F_{EMV1}$, $F_{EMV2}$ by energizing with the stator currents $i_{A1}$, $i_{A2}$, which propulsive forces add up to the total propulsive force $F_V$ of the transport unit Tn (FIG. 5 above), i.e. $F_V=F_{EMV1}+F_{EMV2}$. As already mentioned, however, an electromagnetic propulsive force $F_{EMV1}$, $F_{EMV2}$ can only be generated on one side. Also in this embodiment example, the generation of an electromagnetic propulsive force $F_{EMV1}$ in the movement direction x is stopped in the transfer area of the transfer position U (FIG. 5 center) on at least one first side. Therefore, only the electromagnetic propulsive force $F_{EMV2}$ of the other side acts on the transport unit Tn as propulsive force $F_V$ in the movement direction x, or no electromagnetic propulsive force $F_{EMV2}$ can be generated on the other side either. In the latter case, the transport unit Tn would again travel through the transfer area of the transfer position U in the movement direction x without an active drive. On the first side, the drive coils 8 of this side interacting with the transport unit Tn are energized with a stator current $i_{A1}$, which causes only a braking force $F_B$ against the movement direction x of the transport unit Tn, but no force component in the movement direction x. Due to the electromagnetic propulsive force $F_{EMV2}$ on the second side and the opposite braking force Fe on the first side, a torque occurs on the transport unit Tn as a steering effect L about the vertical axis z. If no electromagnetic propulsive force $F_{EMV2}$ is generated on the second side in the transfer area of the transfer position U, at least an inertial force Fr in the movement direction x would act on the transport unit Tn as a result of the movement of the transport unit Tn in the movement direction x, so that with the braking force $F_B$ and the inertial force $F_T$ a torque is also produced as a steering effect L. This torque can now also be used as a steering effect L to guide the transport unit Tn along a desired transport section An. Am.

In the exit area of the transfer position (FIG. 5 below), the brake force $F_B$ against the movement direction x can be switched off again and the transport unit Tn can only be moved further driven on one side as usual, or a drive on both sides can also be provided.

The method of the lateral force as steering effect L and the method of the torque as steering effect L can also be combined. In this case, only an electromagnetic lateral force and a braking force against the movement direction x of the transport unit Tn would be generated on a first side, but no force component in the movement direction x. On the opposite second side, an electromagnetic lateral force $F_{EMS2}$ and/or an electromagnetic propulsive force $F_{EMV2}$ (in the movement direction x) can be generated as required. On the second side, however, the drive coils 8 interacting with the transport unit Tn can also be currentless, therefore no stator current $i_{A2}$ would be impressed into these drive coils 8 in this case.

The application of a sufficient steering effect L is of course only necessary until the guide members of the transport unit Tn, e.g. rollers, wheels, sliding surfaces, magnetic bearings or similar, have a safe effect on the desired transport section Am, An. This ensures a defined location of the transport unit Tn and at the latest then the active control of the drive coils 7, 8 for applying the steering effect L can be terminated.

The electromagnetic propulsive force $F_{EMV1}$, $F_{EMV2}$ is usually control by position presetting. For this purpose, a set-point position can be specified to a position controller, which calculates the required current component $i_{Aq1}$, $i_{Aq2}$, which forms the propulsive force, from the difference between the set-point position and an actual position (which can be measured with suitable position sensors or derived from other measured variables). Equivalent to this, speed control could also be provided. This propulsive force-forming current component $i_{Aq1}$, $i_{Aq2}$ is then converted into the stator currents $i_{A1}$, $i_{A2}$ of the acting drive coils 7, 8 (or equivalent into coil voltages) and the drive coils 7, 8 are supplied with these currents. For the generation of an electromagnetic lateral force $F_{EMS1}$, $F_{EMS2}$ a flux controller can be provided to which a set-point flux is specified. The required lateral force-forming current component $i_{Ad1}$, $i_{Ad2}$ can be calculated from the difference between the set-point flux and an actual magnetic flux (which, for example, can be measured or derived from other measured variables), which component can then be converted into the stator currents $i_{A1}$, $i_{A2}$ of the acting drive coils 7, 8 (or equivalent into coil voltages). If a propulsive force-forming current component $i_{Aq1}$, $i_{Aq2}$ and a lateral force-forming current component $i_{Ad1}$, $i_{Ad2}$ are required simultaneously, the resulting current vector is converted into the required stator currents $i_{A1}$, $i_{A2}$. In the transfer area of the transfer position U, the set-point values (set-point flux and/or set-point position) must now be specified in such a way that the desired effect is achieved on the desired side (only an electromagnetic lateral force $F_{EMS1}$ and/or only a braking force $F_B$). Alternatively, the position controller and/or the flux controller on the desired side could also be deactivated and preset stator currents $i_{A1}$ applied instead to cause the desired effect (only a lateral electromagnetic force $F_{EMS1}$ and/or only a braking force $F_B$).

The invention claimed is:

1. A method for transferring a transport unit of a long-stator linear motor at a transfer position from a first transport section, having a number of drive coils arranged one behind the other in the movement direction of the transport unit in the area of the transfer position, to a second transport section, having a number of drive coils arranged one behind the other in the movement direction of the transport unit in the area of the transfer position, wherein excitation magnets being arranged on each side of the transport unit, which excitation magnets interact with drive coils in the area of the transport unit for moving the transport unit in the movement direction by generating an electromagnetic field by impressing a stator current into drive coils, which electromagnetic field interacts with excitation magnets on the transport unit and wherein a stator current is impressed into at least one drive coil in a transfer area of the transfer position on at least one side of the transport unit, which stator current generates a steering effect on the transport unit due to a propulsive force-forming current component and/or a lateral force-forming current component of the stator current, characterized in that in the transfer area a stator current is impressed into the drive coils interacting with the transport unit on a first side for generating the steering effect on this first side of the transport unit, which stator current either generates only an electromagnetic lateral force or generates only a braking force against the movement direction of the transport unit, or only a combination thereof.

2. The method according to claim 1, wherein in the transfer area on an opposite second side of the transport unit no stator current is impressed into at least one drive coil interacting with the transport unit on this second side.

3. The method according to claim 2, wherein no stator current is impressed into all drive coils interacting with the transport unit on the second side.

4. The method according to claim 1, wherein in the transfer area on an opposite second side of the transport unit a stator current is impressed into at least one drive coil interacting with the transport unit on this second side, which stator current causes an electromagnetic lateral force.

5. The method according to claim 4, wherein a stator current is impressed into all drive coils interacting with the transport unit on the second side, which stator current causes an electromagnetic lateral force.

6. The method according claim 1, wherein in the transfer area on an opposite second side of the transport unit a stator current is impressed into at least one drive coil interacting with the transport unit on this second side, which stator current causes an electromagnetic propulsive force.

7. The method according to claim 6, wherein a stator current is impressed into all drive coils interacting with the transport unit on the second side, which stator current causes an electromagnetic propulsive force.

* * * * *